US010303968B2

(12) United States Patent
Han

(10) Patent No.: US 10,303,968 B2
(45) Date of Patent: May 28, 2019

(54) METHOD AND APPARATUS FOR IMAGE RECOGNITION

(71) Applicant: BEIJING BAIDU NETCOM SCIENCE AND TECHNOLOGY CO., LTD., Beijing (CN)

(72) Inventor: Junyu Han, Beijing (CN)

(73) Assignee: Beijing Baidu Netcom Science and Technology Co., LTD., Beijing (CN)

(*) Notice: Subject to any disclaimer, the term of this patent is extended or adjusted under 35 U.S.C. 154(b) by 0 days.

(21) Appl. No.: 15/534,795

(22) PCT Filed: Dec. 1, 2015

(86) PCT No.: PCT/CN2015/096127
§ 371 (c)(1),
(2) Date: Jun. 9, 2017

(87) PCT Pub. No.: WO2017/041365
PCT Pub. Date: Mar. 16, 2017

(65) Prior Publication Data
US 2018/0285676 A1  Oct. 4, 2018

(30) Foreign Application Priority Data

Sep. 11, 2015  (CN) .......................... 2015 1 0579670

(51) Int. Cl.
*G06K 9/00* (2006.01)
*G06K 9/34* (2006.01)
(Continued)

(52) U.S. Cl.
CPC ............. *G06K 9/344* (2013.01); *G06F 17/16* (2013.01); *G06K 9/20* (2013.01); *G06K 9/6211* (2013.01); *G06K 2209/01* (2013.01)

(58) Field of Classification Search
CPC ...... G06K 9/18; G06K 9/00215; G06K 9/228; G06K 9/03; G06K 9/06037; G06K 9/6407;
(Continued)

(56) References Cited

U.S. PATENT DOCUMENTS

| 5,093,867 A * | 3/1992 | Hori ...................... G06K 9/4647 382/141 |
| 2007/0076984 A1* | 4/2007 | Takahashi ............ G06K 9/2054 382/305 |

(Continued)

FOREIGN PATENT DOCUMENTS

| CN | 101377847 A | 3/2009 |
| CN | 101957919 A | 1/2011 |

(Continued)

*Primary Examiner* — Amir Alavi
(74) *Attorney, Agent, or Firm* — Miller, Matthias & Hull LLP

(57) ABSTRACT

The present disclosure discloses a method and an apparatus for processing image information. A specific implementation of the method comprises: recognizing each character in an original image and acquiring a position of the each character; matching a character in the original image with a character in a layout structured region of a template image, and recording identical characters or character strings in the original image and the template image as a matching point pair; acquiring a projective transformation matrix between the matching point pairs according to the position of the character in the original image and the position of the character in the layout structured region of the template image; registering the original image according to the projective transformation matrix to acquire a registered image; and recognizing the registered image to acquire a recognition result. This implementation simplifies steps of image matching in character recognition, enhances matching accuracy and universality, and reduces cost of development.

13 Claims, 6 Drawing Sheets

(51) Int. Cl.
*G06K 9/20* (2006.01)
*G06F 17/16* (2006.01)
*G06K 9/62* (2006.01)

(58) Field of Classification Search
CPC .... G06K 9/2009; G06K 9/6423; G06K 9/344; G06F 17/30249; G06F 17/16; G06T 7/001
See application file for complete search history.

(56) References Cited

U.S. PATENT DOCUMENTS

| | | | |
|---|---|---|---|
| 2007/0253616 A1* | 11/2007 | Suto | G03F 9/7069 |
| | | | 382/151 |
| 2011/0243477 A1 | 10/2011 | Minerich | |
| 2014/0119614 A1* | 5/2014 | Mochizuki | G06K 9/00 |
| | | | 382/110 |
| 2015/0169951 A1 | 6/2015 | Khintsitskiy et al. | |
| 2015/0199589 A1* | 7/2015 | Suzuki | G06K 9/00711 |
| | | | 382/181 |
| 2015/0262030 A1* | 9/2015 | Kawabata | G06K 9/18 |
| | | | 382/182 |
| 2017/0243617 A1* | 8/2017 | Lee | G06K 9/00758 |
| 2018/0012349 A1* | 1/2018 | Sakai | H01J 37/22 |
| 2018/0164424 A1* | 6/2018 | Takaki | G01S 7/4021 |

FOREIGN PATENT DOCUMENTS

| | | |
|---|---|---|
| CN | 103544475 A | 1/2014 |
| CN | 103839058 A | 6/2014 |
| CN | 105096244 A | 11/2015 |

* cited by examiner

METHOD AND APPARATUS FOR IMAGE RECOGNITION

CROSS-REFERENCE TO RELATED APPLICATION

This present disclosure is a 35 USC § 371 US National Stage filing of International Application No. PCT/CN2015/096127 filed on Dec. 1, 2015, and claims the benefit and priority of Chinese Patent Application No. 201510579670.8 filed on Sep. 11, 2015, the entire content in which is incorporated herein in its entirely by reference.

TECHNICAL FIELD

The present disclosure relates to the field of computer technologies, particularly to the field of image processing technologies, and more particularly, to a method and apparatus for processing image information.

BACKGROUND

Image processing is mainly used for analyzing an image to obtain a required result. As an important technology in the field of image processing, pattern recognition may research automatic pattern processing and interpretation using a mathematical technical method via a computer. An application of the pattern recognition is the optical character recognition (OCR) technology. In the OCR technology, electronic devices (such as scanners or digital cameras) are utilized to check characters printed on paper, determine shapes of the characters by detecting a pattern of darkness and brightness, and then translate, using a character recognition method, the shapes into computer words that may be further edited and processed by word processing software. However, in the process of recognizing texts in the image, in addition to recognizing a single word in the texts, layout positioning and analysis need to be carried out to analyze structured regions in the image, and then recognition is carried out according to the attributes of these regions to obtain a better recognition effect. Layout positioning and analysis generally need to use an image registration technology. Taking certificate recognition as an example, in the traditional registration scheme, key point positions of the certificate image in the whole image are determined through corner detection or key region (such as human face) detection of the certificate image, and the image is transformed and corrected according to the positions, and targeted recognition is carried out on different regions of the corrected image. However, it is also needed to simplify steps of image matching and enhance matching accuracy and universality.

SUMMARY

The present disclosure provides a method and an apparatus for processing image information to solve the technical problem that steps in image registration are not simplified and the accuracy is not high.

In a first aspect, the present disclosure provides a method for processing image information. The method comprises: recognizing each character in an original image and acquiring a position of the each character; matching a character in the original image with a character in a layout structured region of a template image, and recording identical characters or character strings in the original image and the template image as a matching point pair, wherein the layout structured region of the template image is a region, unchanged in content, in the template image, and a position of the character in the layout structured region of the template image has been labeled; acquiring a projective transformation matrix between matching point pairs according to the position of the character in the original image and the position of the character in the layout structured region of the template image; registering the original image according to the projective transformation matrix to acquire a registered image; and recognizing the registered image to acquire a recognition result.

In some implementations, the template image further comprises a variable region having variable content; and the recognizing the registered image to acquire a recognition result comprises: matching the registered image with the template image to acquire a variable region image of the registered image, wherein the variable region image is an image, corresponding to the variable region of the template image, in the registered image; recognizing a character in the variable region image; and acquiring the recognition result according to the character in the variable region image and the character in the layout structured region of the template image.

In some preferred implementations, the recognizing a character in the variable region image comprises: recognizing the character in the variable region image using a universal optical character recognition engine.

In some preferred implementations, a character type of the variable region in the template image has been labeled; and the recognizing a character in the variable region image comprises: recognizing the character in the variable region image using an optical character recognition engine corresponding to the character type of the variable region in the template image.

In some implementations, the number of the matching point pairs is not less than four.

In some implementations, the projective transformation matrix comprises anyone of: a Euclidean transformation matrix, a similarity transformation matrix, an affine transformation matrix and a projective transformation matrix.

In a second aspect, the present disclosure provides an apparatus for processing image information. The apparatus comprises: an original image recognizing unit, configured to recognize each character in an original image and acquire a position of the each character; a matching unit, configured to match a character in the original image with a character in a layout structured region of a template image, and record identical characters or character strings in the original image and the template image as a matching point pair, wherein the layout structured region of the template image is a region, unchanged in content, in the template image, and a position of the character in the layout structured region of the template image has been labeled; a transformation matrix acquiring unit, configured to acquire a projective transformation matrix between the matching point pairs according to the position of the character in the original image and the position of the character in the layout structured region of the template image; an image registering unit, configured to register the original image according to the projective transformation matrix to acquire a registered image; and a registered image recognizing unit, configured to recognize the registered image to acquire a recognition result.

In some implementations, the template image further comprises a variable region having variable content; and the registered image recognizing unit comprises: a variable region image acquiring subunit, configured to acquire a variable region image of the registered image by matching the registered image with the template image, wherein the variable region image is an image, corresponding to the variable region of the template image, in the registered image; a variable region recognizing subunit, configured to recognize a character in the variable region image; and a recognition result acquiring subunit, configured to acquire the recognition result according to the character in the variable region image and the character in the layout structured region of the template image.

In some preferred implementations, the variable region recognizing subunit is configured to recognize a character in the variable region image using a universal optical character recognition engine.

In some preferred implementations, a character type of the variable region in the template image has been labeled; and the variable region recognizing subunit is configured to recognize the character in the variable region image using an optical character recognition engine corresponding to the character type of the variable region in the template image.

In some implementations, the number of the matching point pairs is not less than four.

In some implementations, the projective transformation matrix comprises anyone of: a Euclidean transformation matrix, a similarity transformation matrix, an affine transformation matrix and a projective transformation matrix.

Using the method and the apparatus for processing image information provided by the present disclosure, a character or character string the same as a content invariable region of a template image is searched from an original image, the identical characters or character strings are recorded as a matching point pair, and the original image is registered using a geometric transform relation of the matching point pair. Image correction may be implemented by means of template matching using this method without corner detection or key region detection, which may simplify the steps of image matching, enhance the matching accuracy and universality, and reduce the development cost.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF THE DISCLOSURE

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
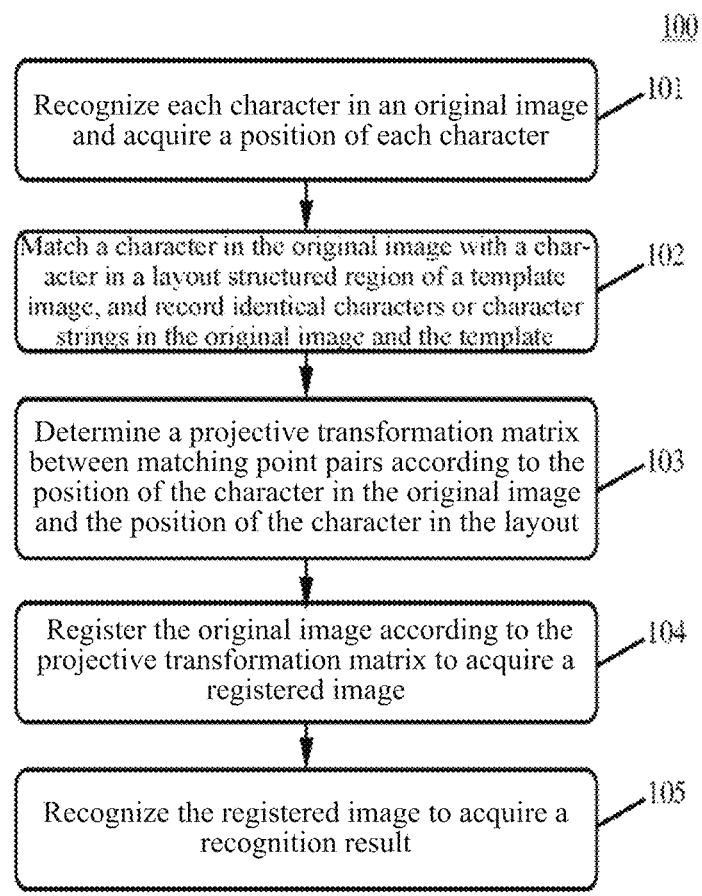
FIG. 1 is a flow of the method for processing image information according to an embodiment of the present disclosure.

First referring to FIG. 1, a flow 100 of a method for processing image information according to an embodiment of the present disclosure is illustrated. The method being applied to an electronic device may be illustrated in this embodiment. The electronic device may comprise a smart mobile phone, a tablet computer, an ebook reader, an MP3 (Moving Picture Experts Group Audio Layer III) player, an MP4 (Moving Picture Experts Group Audio Layer IV) player, a laptop computer, a desktop computer and the like. The method for processing image information may comprise following steps.

Step 101: recognizing each character in an original image and acquiring a position of each character.

In this embodiment, the electronic device may use a universal OCR engine to recognize the original image. The universal OCR engine may be configured to analyze and process the image file to automatically recognize character information in the image. The original image is an acquired to-be-recognized image, which may be an ID image such as an identity card, a driving license and a household register, or may be other images having structured documents, which is not enumerated one by one in this embodiment. The original image may be acquired from a local or remote device, or may be an original image acquired by photographing a real object by relying on an image device (such as a camera or a scanner). Characters recognized in the original image comprise but are not limited to Chinese, English, digital and other characters. In addition to recognizing characters, the electronic device also determines positions, in the original images, of the recognized characters. The position may be represented by a coordinate of a center point of a character, or also may be represented by an upper-left-point coordinate and a bottom-right-point coordinate of the character and other data representing character positions. Those skilled in the art should understand that the above description related to the character types and positions are merely exemplary, and the scope thereof is not limited thereto.

Step 102: matching a character in the original image with a character in a layout structured region of a template image, and recording identical characters or character strings in the original image and the template image as a matching point pair.

Figure 2:
FIG. 2 is a schematic diagram of a template image according to the embodiment corresponding to FIG. 1.

In this embodiment, the electronic device matches the character in the original image with the character in the layout structured region of the template image. The template image may be a known image prestored in the electronic device. The layout structured region in the template image is labeled in advance, wherein the layout structured region is a region unchanged in content in the template image. Regarding to an image identical in type to the template image, a layout structured region the same as that in the template image is present in the two images, and both the position and the content in the layout structured region are the same as the layout structured region in the template image. FIG. 2 illustrates a schematic diagram of a driving license template image, in which a layout structured region is labeled using a rectangular box. For example, a layout structured region is labeled using a rectangle at the most upper end of the figure. The content in this region is "Motor Vehicle Driving License of the People's Republic of China", and is unchanged in content. The content in any other driving license images in the region is also necessarily "Motor Vehicle Driving License of the People's Republic of China."

Furthermore, in this embodiment, the position of the character in the layout structured region of the template image also is labeled. Like the characters in the original image, the characters in the template image may also comprise, but are not limited to Chinese, English, digital and similar characters, and the positions of the labeled characters may be represented by the coordinate of the character center point, and also may be represented by the coordinate of the character left-upper point, the coordinate of the character right-down point and other data that may represent character positions. The same standard (for example, using center point coordinates to represent positions) may be adopted for the character positions acquired in Step 101 and the previously labeled position of the template image, so as to enhance the matching accuracy and reduce the matching complexity. It is to be noted that whether the same standard is adopted for the character positions doesn't affect the scope of protection of this embodiment.

Figure 3A:
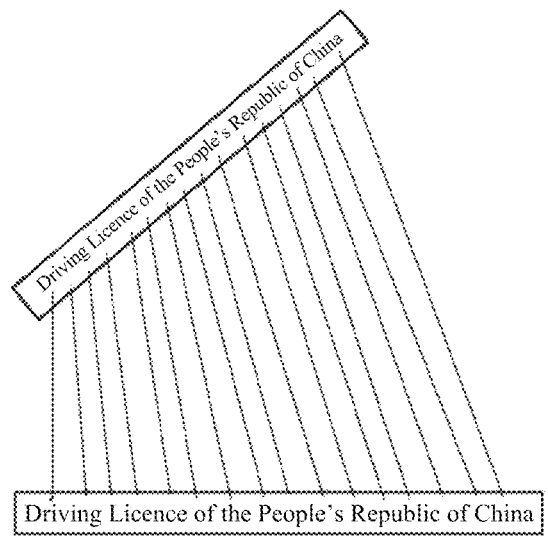
FIG. 3a is a schematic diagram of acquiring matching point pairs according to the embodiment corresponding to FIG. 1.

In this embodiment, the specific matching method may be as below: a single character or character string is selected from the layout structured region of the template image, then it is searched whether the same character or character string is present in the characters recognized from the original image; when the same character or character string is present, the character or character string of the layout structured region of the template image and the same character or character string in the original image are recorded as a matching point pair. Every time when a matching point pair is searched, the next matching point pair may be searched in the same way. It is to be noted that the object for matching in the template image may be a single character or a character string. More specifically, the object may be a digit, an English letter or a Chinese character, or may be a numeric string, an English word, a Chinese word, or a combination of the above objects or other texts that can be represented by characters. FIG. 3a is a schematic diagram of matching by taking the single Chinese character as an object. In this figure, the rectangular box beneath represents the layout structured region of the template image and the Chinese characters in the region, and the rectangular box above represents Chinese character the same as those searched out from the original image character. The character "thong" in the upper rectangular box and the character "thong" in the lower rectangular box constitute a matching point pair, the character "Hua" in the upper rectangular box and the character "Hua" in the lower rectangular box constitute a matching point pair, and so on. In the figure, in total 13 matching point pairs are shown, namely, "thong", "Hua", "Ren", "Ming", "Gong", "He", "Guo", "Ji", "Dong", "Che", "Jia", "Shi", "Zheng".

It is to be noted that the matching method also may comprise: first selecting a single character or character string from the original image, and then searching whether the same character or character string is present in the layout structured region of the template image. Furthermore, the matching may be performed after completing the recognition of the whole original image in Step 101, or may be performed immediately after recognizing a part of characters in the original image. Those skilled in the art should appreciate that in this embodiment, the matching between the characters in the original image and the characters in the layout structured region of the template image may also comprise other similar implementations.

It is also to be noted that if the content in a certain layout structured region in the template image is peculiar to this type of image, that is, if images of other types do not have the same content, it may be determined whether the current template image fits with the original image by determining whether the peculiar content is present in the original image. When the current template image does not fit with the original image, another template image is selected from a template library for further determination.

Step 103: determining a projective transformation matrix between matching point pairs according to the position of the character in the original image and the position of the character in the layout structured region of the template image.

In this embodiment, the position of each character in the original image had been acquired in Step 101 and the position of each character in the layout structured region of the template image also has been labeled, but the matching point pair is acquired from both. Therefore, when the matching point pair is a single character, the position of the matching point pair in the two images may be directly acquired. When the matching point pair is a character string comprising a plurality of characters, the position of the matching point pair may be acquired after calculation. For example, when the matching point pair is a Chinese word, what is directly acquired is the position of a single Chinese character in the original image and the template image, and the position of the word cannot be directly acquired. At this moment, the position of the middle point between the first Chinese character and the last Chinese character in the word may be calculated, and the position of the middle point is determined as the position of the matching point pair in the two images. After acquiring the position of the matching point pair, a projective transformation matrix between matching point pairs may be acquired according to the position of the matching point pair. Acquisition of the projective transformation matrix may be implemented in two steps, comprising: selecting a geometric transformation model and calculating geometric transformation parameters corresponding to the geometric transformation model. After selecting the geometric transformation model, the corresponding geometric transformation parameters may be acquired according to the position of the matching point pair. The projective transformation matrix may be acquired by means of the selected geometric transformation model and the geometric transformation parameters acquired by calculating.

The above described is merely an example of determining the projective transformation matrix between the matching point pairs according to the position of the character in the layout structured region of the template image and the position of the character in the original image. It may be appreciated by those skilled in the art that determining the projective transformation matrix between the matching point pairs according to the position of the character in the layout structured region of the template image and the position of the character in the original image also may be implemented through other schemes in the prior art, which is not repeated any more herein.

Step 104: registering the original image according to the projective transformation matrix to acquire a registered image.

Figure 3B:
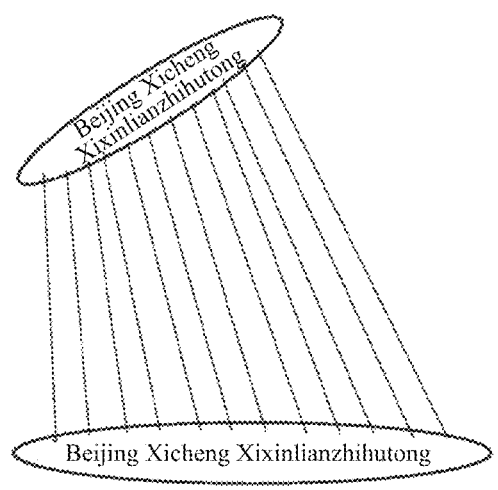
FIG. 3b is a schematic diagram of registering the image according to the embodiment corresponding to FIG. 1.

In this embodiment, the electronic device transforms the original image through the projective transformation matrix calculated in Step 103 to implement image registration. In the registering process, the position of each pixel point on the original image is transformed according to the projective transformation matrix, and the transformed position of the pixel point is displayed in the registered image. FIG. 3b illustrates a schematic diagram of registering the original image. The projective transformation matrix used in FIG. 3b is acquired according to the matching point pair in FIG. 3a. The projective transformation matrix used in FIG. 3b transforms each pixel point in "Beijing Xicheng Xixinlianzhihutong" in the original image. After the transformation, attributes such as position, angle and size of each Chinese character in the registered image are changed. As shown in FIG. 3b, the above displays form of each Chinese character in "Beijing Xicheng Xixinlianzhihutong" in the original image, and the below displays form of each Chinese characters in "Beijing Xicheng Xixinlianzhihutong" in the registered image after the transformation. It may be found that the position, angle and size of each Chinese character in the registered image correspond to those of the Chinese characters in the layout structured region of the template image in FIG. 3a.

Transforming the position of each pixel point based on the known projective transformation matrix belongs to the prior art, which is not described in detail in the present disclosure.

Step 105: recognizing the registered image to acquire a recognition result.

In this embodiment, the image obtained in the above steps has been registered by reference to the template image, when recognizing the registered image in Step 105, the recognition difficulty is reduced, and a more accurate recognition result is easily obtained.

With regard to this embodiment, the application scene may be as below: when the user recognizes an image containing a structured document, the user may register the original image through the unchanged characters in the layout structured region of the template image and recognize the registered image. Using the method provided by the above embodiments of the present disclosure, image registration may be implemented by means of a previously labeled template structured region in the template image without corner detection or key region detection, which facilitates simplifying the steps of image matching and enhancing the matching accuracy and universality, and reducing the development cost of image recognition systems.

Figure 4:
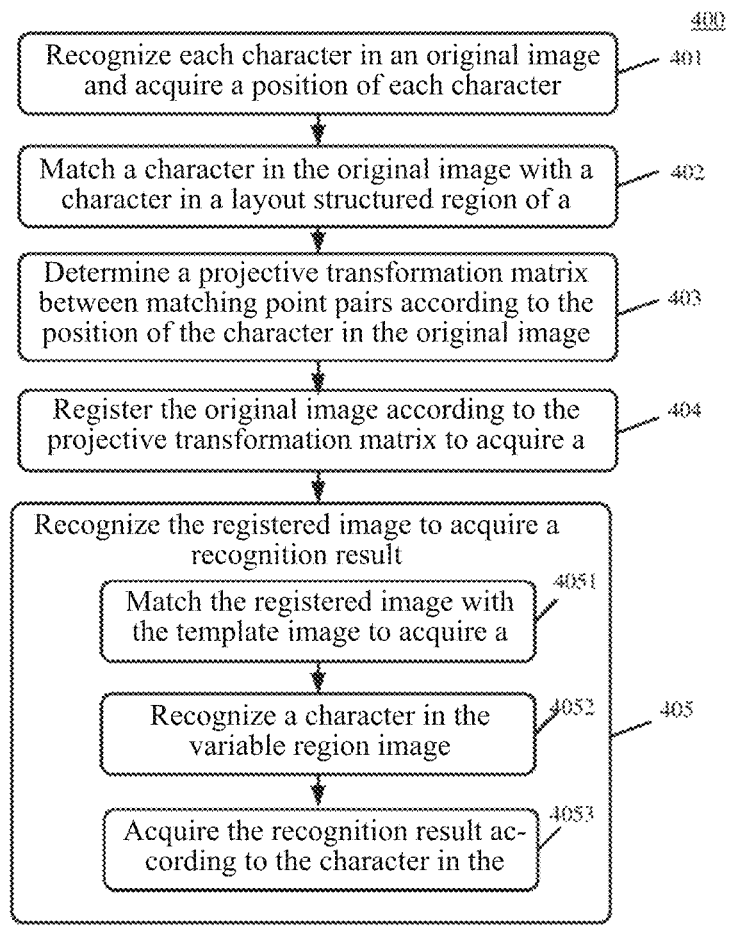
FIG. 4 is a flow of the method for processing image information according to another embodiment of the present disclosure.

Further referring to FIG. 4, a flow 400 of a method for processing image information according to an embodiment of the present disclosure is illustrated, including following steps.

Step 401: recognizing each character in an original image and acquiring a position of each character.

In this embodiment, Step 402 is consistent with Step 101 in the embodiment corresponding FIG. 1, which is not repeated any more herein.

Step 402: matching a character in the original image with a character in a layout structured region of a template image, and recording identical characters or character strings in the original image and the template image as a matching point pair.

Figure 5:
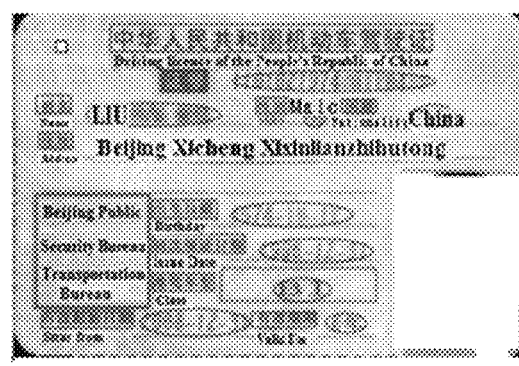
FIG. 5 is a schematic diagram of a template image according to the embodiment corresponding to FIG. 4.

Different from the embodiment corresponding to FIG. 1, in the template image of this embodiment, the variable region having variable content is also labeled. Variable content refers to a fact that in other images the same as the template image in type, the content in this region may be different from the content in this region in the template image. FIG. 5 illustrates a schematic diagram of the template image in this embodiment, in which regions labeled by ovals are the variable regions. In FIG. 5, 'B1' in the oval region on the right of "License Type" represents a specific code of a licensed driving vehicle type, but the contents of other driving license images in this region may be not 'B1' but codes of other vehicle types, such as 'B2' or 'A1', etc.

Step 403: determining a projective transformation matrix between matching point pairs according to the position of the character in the original image and the position of the character in the layout structured region of the template image.

In this embodiment, Step 403 is consistent with Step 103 in the embodiment corresponding FIG. 1, which is not repeated any more herein.

Step 404: registering the original image according to the projective transformation matrix to acquire a registered image.

In this embodiment, Step 404 is consistent with Step 104 in the embodiment corresponding FIG. 1, which is not repeated any more herein.

Step 405: recognizing the registered image to acquire a recognition result.

Different from the embodiment corresponding to FIG. 1, Step 405 in this embodiment comprises following substeps.

Step 4051: matching the registered image with the template image to acquire a variable region image of the registered image.

In this embodiment, in addition to the image registration, the template image may be continued to be used in the subsequent image recognition. In this embodiment, the variable region of the template image also is labeled. Therefore, during recognizing the registered image, the content in the variable region of the registered image needs to be recognized, which needs to acquire the image of this region, namely, the above-mentioned variable region image. The position of a certain variable region in the template image is the same as that of the variable region in the registered image, but the variable region in the template image has been labeled. Therefore, the variable region in the registered image may be positioned according to the position of the variable region in the template image. In this way, the variable region image may be acquired.

Step 4052: recognizing a character in the variable region image.

In this embodiment, after acquiring the variable region image in Step 4051, an OCR engine is utilized to recognize the character in the variable region image to acquire the content thereof.

Step 4053: acquiring the recognition result according to the character in the variable region image and the character in the layout structured region of the template image.

With regard to the layout structured region, since the registered image is consistent, in content, with the layout structured region of the template image, the content in the layout structured region of the template image may be directly acquired as the content in the layout structured region of the registered image. Of course, the content in the layout structured region may be acquired using the same method for the variable region. In addition, the character in the variable region has been acquired in Step 4052. The structured information in the image may be acquired according to the content in the layout structured region and the content in the variable region.

It is to be noted that in addition to the layout structured region and the variable region, the registered image may also include an unlabeled blank region. The content in the blank region is noise, and may be not processed in the recognition process.

In one optional implementation of this embodiment, a universal OCR engine is employed to recognize the character in the variable region image.

Since the content in the variable region may be English, Chinese, digits, date or other types, when the content in the variable region is recognized, the universal OCR engine may be used for recognition. The universal OCR engine may be used for recognizing various types of characters.

In one optional implementation of this embodiment, a character type of the variable region in the template image has been labeled; and the recognizing a character in the variable region image comprises: recognizing the character in the variable region image in the registered image using an OCR engine corresponding to the character type of the variable region in the template image.

In this optional implementation, type information of the character in each variable region in the template image also is labeled, that is, the type of the character in each variable region is known. When the variable region is recognized, it is only needed to obtain the character type of the variable region in the template image, and then a corresponding to OCR engine is called according to the character type. In this way, character recognition may be carried out. For example, the region delineated by an oval on the right of "Name" in FIG. 5 is a variable region, wherein the character type of the content in the variable region has been labeled as Chinese. During recognition, the character type Chinese may be learned from the template image, and a Chinese recognition engine is called to recognize the image of this region. Since a recognition engine corresponding to the recognized character type is called during character recognition, this scheme may enhance the recognition accuracy and recognition efficiency of the recognition engine.

In one optional implementation of this embodiment, the number of the matching point pairs is not less than four. In this optional implementation, at least four matching point pairs may be selected, a better registration effect may be acquired, and the recognition accuracy may be enhanced.

In one optional implementation of this embodiment, the projective transformation matrix comprises any one of: a Euclidean transformation matrix, a similarity transformation matrix, an affine transformation matrix and a projective transformation matrix.

In this optional implementation, the projective transformation matrix may be any one of the Euclidean transformation matrix, the similarity transformation matrix, the affine transformation matrix and the projective transformation matrix. The specific method for calculating geometric transformation parameters using a corresponding geometric transformation model according to the selected projective transformation matrix is the prior art in this field, and thus is not elaborated in the present disclosure.

Figure 6:
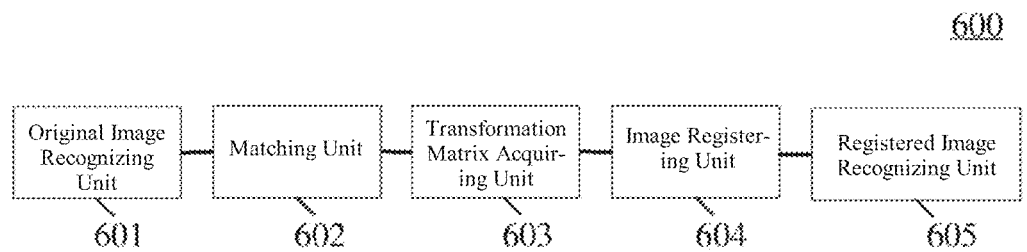
FIG. 6 is a schematic structural diagram of an apparatus for processing image information according to an embodiment of the present disclosure.

Further referring to FIG. 6, as an implementation of the method as shown in the foregoing figures, the present disclosure provides an embodiment of an apparatus for processing image information. The apparatus embodiment corresponds to the method embodiment as shown in FIG. 1, and the apparatus specifically may be used in various electronic devices.

As shown in FIG. 6, the apparatus 600 for processing image information as described in this embodiment comprises: an original image recognizing unit 601, a matching unit 602, a transformation matrix acquiring unit 603, an image registering unit 604 and a registered image recognizing unit 605. The original image recognizing unit 601 is configured to recognize each character in an original image and acquire a position of the each character. The matching unit 602 is configured to match a character in the original image with a character in a layout structured region of a template image, and record identical characters or character strings in the original image and the template image as a matching point pair, wherein the layout structured region of the template image is a region, unchanged in content, in the template image, and a position of the character in the layout structured region of the template image has been labeled. The transformation matrix acquiring unit 603 is configured to acquire a projective transformation matrix between the matching point pairs according to the position of the character in the original image and the position of the character in the layout structured region of the template image. The image registering unit 604 is configured to register the original image according to the projective transformation matrix to acquire a registered image. The registered image recognizing unit 605 is configured to recognize the registered image to acquire a recognition result.

In this embodiment, when a user uses the apparatus 600 in the electronic device, after the apparatus 600 performs a preliminary recognition by means of the original image recognizing unit 601, the matching unit 602 matches the recognized character with the character of the layout structured region of the template image to acquire a matching point pair, then the original image is transformed by the transformation matrix acquiring unit 603 and the image registering unit 604, and finally the transformed image is recognized by using the registered image recognizing unit 605. In this way, the user may accurately acquire the structured information of the image.

Those skilled in the art may understand that the electronic device further comprises some other known structures such as a processor or a memory. These known structures are not shown in FIG. 6 in order to not unnecessarily obscure the embodiments of the present disclosure.

The units or modules involved in the embodiments of the present disclosure may be implemented by way of software or hardware. The described units or modules may also be provided in a processor, for example, described as: a processor, comprising an original image recognizing unit, a matching unit, a transformation matrix acquiring unit, an image registering unit and a registered image recognizing unit, where the names of these units or modules are not considered as a limitation to the units or modules. For example, the original image recognizing unit may also be described as "a unit for recognizing an original image".

Figure 7:
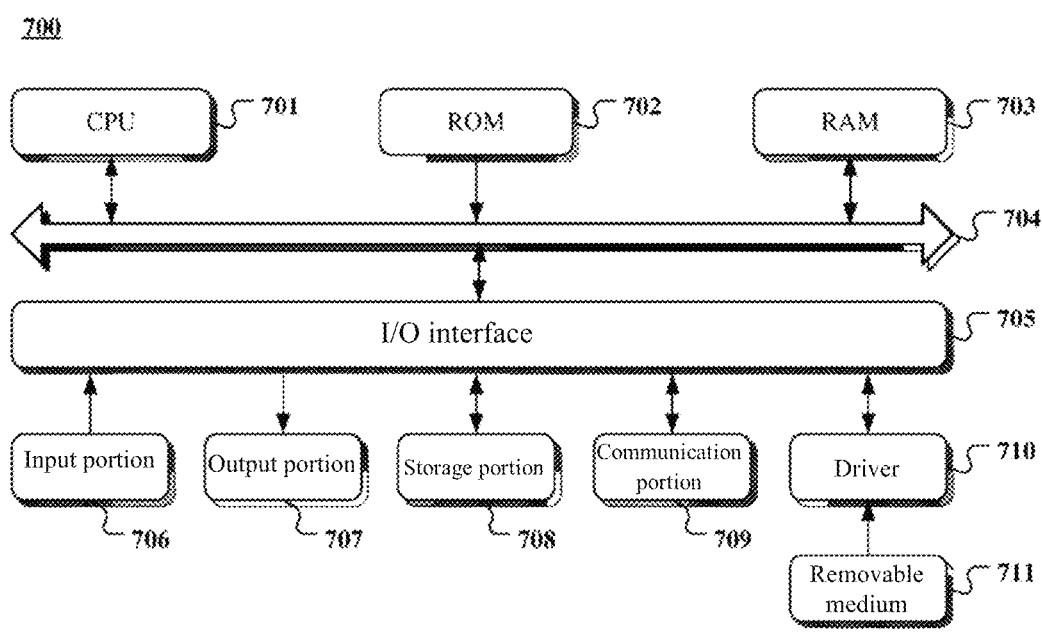
FIG. 7 is a schematic structural diagram of a computer system according to embodiments of the present disclosure.

Referring to FIG. 7, a schematic structural diagram of a computer system 700 adapted to implement a device of the embodiments of the present disclosure is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 611, and the installation thereof on the storage portion 708 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711.

The flowcharts and block diagrams in the figures illustrate architectures, functions and operations that may be implemented according to the system and the method of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: recognize each character in an original image and acquiring a position of the each character; match a character in the original image with a character in a layout structured region of a template image, and record identical characters or character strings in the original image and the template image as a matching point pair, wherein the layout structured region of the template image is a region, unchanged in content, in the template image, and a position of the character in the layout structured region of the template image has been labeled; determine a projective transformation matrix between matching point pairs according to the position of the character in the original image and the position of the character in the layout structured region of the template image; register the original image according to the projective transformation matrix to acquire a registered image; and recognize the registered image to acquire a recognition result.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for processing image information, comprising:
    recognizing each character in an original image and acquiring a position of the each character;
    matching a character in the original image with a character in a layout structured region of a template image, and recording identical characters or character strings in the original image and the template image as a matching point pair, the layout structured region of the template image being a region, unchanged in content, in the template image, and a position of the character in the layout structured region of the template image having been labeled;
    acquiring a projective transformation matrix between matching point pairs according to the position of the character in the original image and the position of the character in the layout structured region of the template image, the projective transformation matrix indicating a position change between the matching point pairs;
    registering the original image according to the projective transformation matrix to acquire a registered image, comprising changing the position of the character on the original image to a position of the character on the registered image according to the projective transformation; and
    recognizing the registered image to acquire a recognition result.

2. The method according to claim 1, wherein the template image further comprises a variable region having variable content; and
    the recognizing the registered image to acquire a recognition result comprises:
    matching the registered image with the template image to acquire a variable region image of the registered image, the variable region image being an image, corresponding to the variable region of the template image, in the registered image;
    recognizing a character in the variable region image; and
    acquiring the recognition result according to the character in the variable region image and the character in the layout structured region of the template image.

3. The method according to claim 2, wherein the recognizing a character in the variable region image comprises:
    recognizing the character in the variable region image using a universal optical character recognition engine.

4. The method according to claim 2, wherein a character type of the variable region in the template image has been labeled; and the recognizing a character in the variable region image comprises:

recognizing the character in the variable region image using an optical character recognition engine corresponding to the character type of the variable region in the template image.

5. The method according to claim 1, wherein the number of the matching point pairs is not less than four.

6. The method according to claim 1, wherein the projective transformation matrix comprises any one of: a Euclidean transformation matrix, a similarity transformation matrix, an affine transformation matrix and a projective transformation matrix.

7. A non-transitory computer storage medium, storing a computer-readable instruction that can be executed by the processor, and when the computer-readable instruction being executed by the processor, the processor performing the method according to claim 1.

8. An apparatus for processing image information, comprising:

at least one processor; and a memory storing instructions, the instructions when executed by the at least one processor, cause the at least one processor to perform operations, the operations comprising;

recognizing each character in an original image and acquire a position of the each character;

matching a character in the original image with a character in a layout structured region of a template image, and record identical characters or character strings in the original image and the template image as a matching point pair, the layout structured region of the template image being a region, unchanged in content, in the template image, and a position of the character in the layout structured region of the template image having been labeled;

acquiring a projective transformation matrix between the matching point pairs according to the position of the character in the original image and the position of the character in the layout structured region of the template image, the projective transformation matrix indicating a position change between the matching point pairs;

registering the original image according to the projective transformation matrix to acquire a registered image, comprising changing the position of the character on the original image to a position of the character on the registered image according to the projective transformation; and recognizing the registered image to acquire a recognition result.

9. The apparatus according to claim 8, wherein the template image further comprises a variable region having variable content; and the recognizing the registered image to acquire a recognition result comprises:

matching the registered image with the template image to acquire a variable region image of the registered image, the variable region image being an image, corresponding to the variable region of the template image, in the registered image;

recognizing subunit a character in the variable region image; and acquiring the recognition result according to the character in the variable region image and the character in the layout structured region of the template image.

10. The apparatus according to claim 9, wherein the recognizing a character in the variable region image comprises:

recognizing the character in the variable region image using a universal optical character recognition engine.

11. The apparatus according to claim 9, wherein a character type of the variable region in the template image has been labeled; and the recognizing, a character in the variable region image comprises;

recognizing the character in the variable region image using an optical character recognition engine corresponding to the character type of the variable region in the template image.

12. The apparatus according to claim 8, wherein the number of the matching, point pairs is not less than four.

13. The apparatus according to claim 8, wherein the projective transformation matrix comprises any one of: a Euclidean transformation matrix, a similarity transformation matrix, an affine transformation matrix and a projective transformation matrix.

* * * * *